United States Patent [19]
Langhammer

[11] 3,897,243
[45] July 29, 1975

[54] SMELTING PROCESS AND FURNACE

[75] Inventor: Hans-Jüergen Langhammer, Bremen, Germany

[73] Assignee: Klockner-Werke AG, Duisburg, Germany

[22] Filed: Mar. 2, 1973

[21] Appl. No.: 337,736

[30] Foreign Application Priority Data
Mar. 4, 1972 Germany............................ 2210467

[52] U.S. Cl. ...................... 75/10 V; 75/12; 75/44 S
[51] Int. Cl. .......................... C22d 7/00; C21c 7/00
[58] Field of Search............ 75/38, 40, 43, 44 S, 10, 75/11, 12

[56] References Cited
UNITED STATES PATENTS

| 2,886,304 | 5/1959 | Guthrie | 75/44 S |
| 3,511,643 | 5/1970 | Vallak | 75/40 |
| 3,669,434 | 6/1972 | Geck | 75/44 S |
| 3,708,599 | 1/1973 | Krause | 75/10 |

FOREIGN PATENTS OR APPLICATIONS

| 1,911,994 | 9/1970 | Germany | 75/44 S |

Primary Examiner—P. D. Rosenberg
Attorney, Agent, or Firm—Michael S. Striker

[57] ABSTRACT

A furnace for the continuous production of steel from scrap wherein the scrap enters the upper region of the smelting zone and descends by gravity to the lower region. An electric arc smelts the leading end of the scrap in the lower region under non-oxidizing conditions. The scrap in the upper region of the smelting zone is preheated so that its parts are welded to each other and form a skeleton which descends into the range of the electric arc.

18 Claims, 1 Drawing Figure

PATENTED JUL29 1975      3,897,243
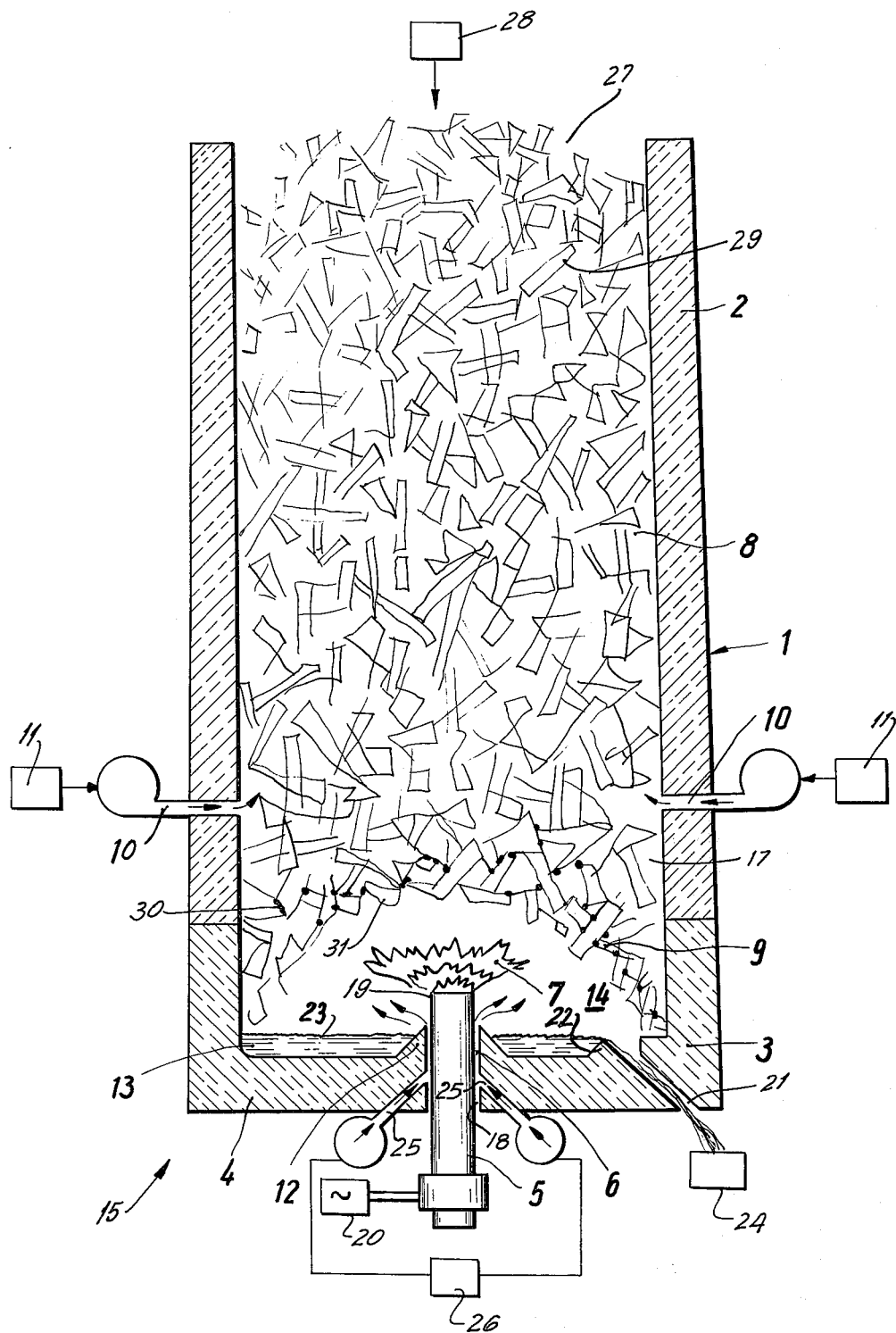

SMELTING PROCESS AND FURNACE

BACKGROUND OF THE INVENTION

The invention relates generally to a process and furnace for the production of metals and alloys. More particularly, the invention relates to a process and furnace for the continuous production of metals and alloys from scrap, such as the production of steel from iron.

The continuous smelting of scrap as well as the use of the counterflow principle, i.e., the principle by which the reacting components move countercurrent to each other, have already long been practiced in blast furnaces, particularly for the smelting of ore and carbonaceous material so as to produce pig iron. The counterflow principle is advantageous since it produces the optimum reaction conditions by causing the reacting components to be intimately mixed, thereby, in essence, causing a forcible alloying of the various constituents. However, such blast furnaces produce pig iron which must then be further processed in order to produce steel. The cupola process, i.e., a process carried out in a cupola furnace, is also adaptable to continuous smelting, even of scrap, as well as to the use of the counterflow principle but only when the end product is to be pig iron such as foundry or casting pig iron.

In the production of pig iron, whether in a cupola furnace or a blast furnace, the coke serves simultaneously as a fuel, as an alloying element and, above all, as a support structure or frame for the burden which is charged on top of it. As a result, the counterflow principle and the attendant forcible alloying are effective here since the gases generated by combustion of the coke flow upwardly through the burden while the burden moves downwardly so as to mix with the combustion products and produce pig iron. In this manner, pig iron may be produced in a continuous process. However, until now, no practical continuous smelting process in shaft furnaces, such as blast furnaces and cupola furnaces, has been possible in the absence of coke and the resultant absence of forcible alloying.

The production of steel, as opposed to pig iron, from scrap is carried out almost exclusively in hearth-type furnaces using either the Siemens-Martin process or an electrolytic process. These processes, which have been dominant until now, are discontinuous or batch-type processes which are carried out under unfavorable production conditions. The counterflow principle does not exist in these processes, the charging conditions are not favorable and the processes utilize indirect heating. No possibility was seen heretofore for carrying over the superior operating principles used for the production of pig iron in the blast furnace to the direct production of steel.

It may be shown by semi-quantitative experiments that it is both technically possible and economically favorable to continously smelt a column or stack of scrap from the bottom. This smelting process is carried out with the aid of the counterflow principle by using a plate-like burner flame formed by the combustion of oil and oxygen. The combustion gases rise as the scrap descends. Since the charge (primarily scrap) is partially oxidized during smelting, it is necessary to perform an extra step after smelting in order to have steel as the final product. This step involves carrying out an extraction reaction in the collecting vessel for the molten material, the extraction reaction being performed in the presence of pig iron or carbonaceous material. It can be shown that this smelting process has many advantages as regards energy and production considerations. However, this process also has the disadvantage that the scrap is unavoidably oxidized in the atmosphere of the flame during smelting and, in order to avoid large losses of the material as slag, it is necessary to later cancel or reverse the oxidation in the collecting vessel for the molten material. This smelting process corresponds exactly to that in conventional Siemens-Martin furnaces in this regard, since oxidation of the scrap by the combustion gases which occurs in the Siemens-Martin process must be compensated for by adding pig iron or coke to the charge. In contrast, the smelting atmosphere in the electrolytic process is either a neutral or a reducing atmosphere so that there is no fear of oxidation.

A new process has been proposed in view of the above considerations wherein the technology of smelting a stack of scrap from the bottom with a burner flame has been maintained. The surprising effect obtained is a result of the fact that the individual pieces of scrap in a descending stack of metallic scrap are welded to one another at their many points of contact under the influence of the smelting heat. Thus, the stack, which in its upper region is composed of a multitude of individual pieces of scrap is, in its lower region, transformed into a rigid, fully welded iron structure or framework. This structure behaves like a solid body until it smelts, that is, up to temperatures of over 1,500°C. On the one hand, a cavity is formed in the lower surface of the welded structure due to smelting of the material nearest the source of heat, which cavity, however, does not cause the structure to cave in. On the other hand, the welded structure supports that portion of the charge which occupies the upper region of the stack. The stack, formed by the scrap charged into the shaft of the furnace, descends continuously along the shaft. Since the walls of the shaft are substantially smooth, the descent of the stack is unhindered by the walls and the descending stack smelts layer by layer in the manner of a candle which is melted from the bottom.

This process is feasible only if the molten material flowing out of the smelting chamber immediately flows into a vessel containing carbonaceous material, for example, in the form of pig iron, so that the molten iron oxide can react with the pig iron and convert the carbon therein to carbon dioxide gas. As a result of this reaction, wherein the oxygen in the molten iron oxide combines with the carbon in the pig iron to produce gaseous carbon dioxide, the iron oxide is converted into steel. In this manner, steel is produced in a two-step process.

SUMMARY OF THE INVENTION

It is, accordingly, an object of the invention to provide a process and furnace whereby the production of steel from scrap may be accomplished in a single step.

Another object of the invention is to provide a process and furnace for the continuous production of steel from scrap.

A further object of the invention is to provide a process and furnace for the production of steel wherein smelting takes place under non-oxidizing conditions.

It is also an object of the invention to provide a process and furnace for the production of steel wherein the counterflow principle is utilized.

An additional object of the invention is to provide a process and furnace for the production of steel wherein the principle of smelting the charge from below is utilized.

In accordance with the invention, these and other objects are attained by the provision of a process which comprises the steps of charging the scrap into a smelting zone at an upper region thereof, the scrap descending by gravity to a lower region thereof. The leading end of the descending scrap is smelted in the lower region under non-oxidizing conditions and the molten material is evacuated. A furnace for the continuous production of steel from scrap is also disclosed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a diagrammatic vertical sectional view of a furnace embodying the invention.

DESCRIPTION OF THE PREFERRED EMBODIMENTS

The furnace, shown generally at 15, is of the type known as a shaft furnace. A shaft furnace is a vertical furnace and perhaps the most important examples of a shaft furnace are the blast furnace and the cupola furnace.

The furnace 15 includes a wall 1 defining a smelting zone or chamber 16. The chamber 16 preferably has a substantially uniform cross-section and may have any appropriate cross-sectional configuration. For example, the chamber 16 may have a rectangular, square or round cross-section. It is, of course, also possible for the chamber 16 to have a non-uniform cross-section, e.g., to have the form of a truncated cone, for example, in which case the wall 1, shown here as being upright or substantially vertical, would be inclined with respect to the vertical.

The chamber 16 comprises an upper portion or region 8 defined by the upper wall portion or section 2 and a lower portion or region 17 defined by the lower wall portion or section 3. The transverse wall or bottom wall 4 is fast with the lower wall section 3. The wall sections 2 and 3 as well as the bottom wall 4 are all made of or coated with a heat resistant substance. Preferably, however, the lowermost part of the lower wall sections 3 as well as the bottom wall 4 comprise a high-grade or heavy duty heat resistant substance. The inner surfaces of the wall sections 2 and 3 should preferably be sustantially smooth and contain no protuberances or depressions which may interfere with the descent of material through the chamber 16.

The heating or smelting means for smelting the charge of scrap, e.g., scrap iron, or other material charged into the chamber 16 is here shown as comprising an electrode 5. The electrode 5 extends through an opening 18 provided in the bottom wall 4 so that the upper end portion or upper end 19 of the electrode 5 is located in the lower region 17 of the chamber 16. At its lower end, the electrode 5 is connected to a power source 20. The electrode 5 is so dimensioned with respect to the opening 18 that it fits in the opening 18 with clearance, as a result of which a preferably annular clearance space or passage 6 exists between the electrode 5 and the bottom wall 4. The electrode 5 is adjustable so that it may be moved up and down as desired. Preferably, the electrode 5 is centered in the chamber 16. Also, although the heating or smelting means is here shown as comprising a single electrode 5, it is, of course, possible to provide a plurality of electrodes extending through the bottom wall 4. For example, it may be desirable in some cases to have three electrodes for smelting the charge. When more than one electrode is used, it is preferable to distribute the electrodes symmetrically with respect to the cross-section of the chamber 16 although, in the final analysis, the distribution of the electrodes will be determined by the particular application. The power source 20 may be a direct current source or an alternating current source depending upon the number of electrodes and other conditions. The important consideration in selecting the smelting means is that it be non-oxidizing and be capable of operating in a non-oxidizing atmosphere, i.e., a neutral or reducing atmosphere.

The inner surface of the bottom wall 4 is provided with a protuberance or projection 12 which circumferentially surrounds the electrode 5 with clearance so that the passage 6 communicates with the lower region 17 of the chamber 16 at the top of the projection 12. By virtue of the projection 12, a collecting space 13 is formed in the lower region 17 of the chamber 16. The collecting space 13 collects the molten material and, because of the projection 12, prevents contact between the molten material and the electrode 5 and, in addition, prevents the molten material from flowing into the passage 6, so that clogging of the passage 6 is avoided. Evacuating means for evacuating the molten material from the chamber 16 is here shown as including an outlet passage 21 which, at one of its ends, communicates with the collecting space 13 or, in other words, with the lower region 17 of the chamber 16. Near the outlet passage 21, the inner surface of the bottom wall 4 is provided with another protuberance or projection 22, the top of which is at a lower level than the top of the projection 12 surrounding the electrode 5. In this manner, a pool of the molten material may always be maintained in the collecting space 13 while, at the same time, it is assured that the height or level 23 of the molten material is below the top of the projection 12 surrounding the electrode 5. The outlet passage 21 also communicates with a container 24 into which the molten material flows from the collecting space 13. It is important that the collecting space 13 communicate only with the container 24 in order to avoid oxidation of the molten material as it flows from the collecting space 13 to the container 24 and in order to insure that no oxygen enter the lower region 17 of the chamber 16. The projections 12 and 22 are preferably made of or coated with a high-grade or heavy-duty heat resistant substance.

Fuel admitting means is provided for admitting at least one stream of fuel into the lower region 17 of the chamber 16. The term fuel as used herein includes fossil fuels. Suitable fuels include natural gas, by-product coke-oven gas, blue-water gas, oil and other corresponding gaseous or gasified combustible materials. The fuel admitting means includes at least one inlet passage 25 which, at one of its ends, communicates with the opening 18 in the bottom wall 4 or, in other words, with the passage 6, and at the other of its ends communicates with a source 26 of fuel. Valve means may be provided for controlling the rate at which fuel enters the lower region 17 of the chamber 16. From the inlet passage 25, the fuel flows into and through the passage 6 to enter the lower region 17 of the chamber 16 and thence flows upwardly towards the upper region 8 of the chamber 16. The fuel should be free of oxygen since one of the purposes of the fuel is to aid in maintaining a non-oxidizing atmosphere in the lower region 17 of the chamber 16. The fuel flowing out of the passage 6 is heated by the electric arc 7 generated by the electrode 5 so that, as it rises through the chamber 16, the fuel is able to transmit heat to the charge by convection. Also, the fuel may be introduced into the lower region 17 of the chamber 16 in any suitable manner, for example, by pumping or blowing in the fuel or by allowing the fuel to enter by aspiration.

Air admitting means admits at least one current of air into the upper region 8 of the chamber 16. The term air as used herein includes oxygen or any suitable gaseous or gasified substance containing oxygen. The air admitting means comprises at least one inlet duct 10 which, at one of its ends, communicates with the upper region 8 of the chamber 16 and, at the other of its ends, communicates with the atmosphere or a suitable source 11 of air. Valve means may be provided for controlling the rate at which air enters the upper region 8 of the chamber 16. The air may aspirate into the upper region 8 of the chamber 16 or may be forcibly introduced therein by pump means or blower means. It is seen that the air enters the chamber 16 at a peripheral portion of the upper region 8 thereof and, in the embodiment shown, the entering air flows in a direction substantially normal to the longitudinal direction of the chamber 16. However, it is also possible for the inlet duct 10 to be slanted so that the air enters the upper region 8 of the chamber 16 with an upward component of flow. The air should not be permitted to enter the lower region 17 of the chamber 16 in order that a non-oxidizing atmosphere be maintained therein. The fuel flowing upwardly from the lower region 17 of the chamber 16 will force the air to flow upwardly and thereby insures that no air enters the lower region 17. Thus, the lower region 17 is that portion of the chamber 16 located below the inlet duct 10 whereas the upper region 8 is that portion of the chamber 16 extending upwardly from the inlet duct 10. The fuel and air mix and combust in the upper region 8 of the chamber 16 and the heat of combustion serves to preheat the charge. The combustion gases may be removed from the chamber 16 in any conventional manner. For example, suitable suction means such as an exhaust fan may be provided for removing the combustion gases or the combustion gases may escape directly to the atmosphere.

Suitable charging means introduces the charge into the upper region 8 of the chamber 16. The charging means comprises a material inlet 27 which, in the embodiment shown, is the upper open end of the chamber 16. The charge comes from a source 28 of material and regulating means may be provided for controlling the rate of entry of the charge into the upper region 8 of the chamber 16. The charge descends by gravity in the chamber 16 from the upper region 8 to the lower region 17, the descent of the charge being unhindered by virtue of the fact that the inner surface of the wall 1 is substantially smooth. The charge may include, in addition to the scrap or other material, the alloying elements or components required for the steel and, when such alloying elements are included in the charge, it is preferable to have them homogeneously distributed throughout the charge.

In operation, the charge, which includes many discrete pieces of material, is introduced into the upper region 8 of the chamber 16 through the material inlet 27. The charging step may include homogenously mixing the alloying elements for the steel with the other material forming the charge. The charge descends continuously by gravity from the upper region 8 to the lower region 17 of the chamber 16 and forms a stack or column 29 which extends from the upper region 8 to the lower region 17 of the chamber 16. Fuel is admitted into the lower region 17 of the chamber 16 via the passage 6 so as to establish and maintain a non-oxidizing atmosphere in the lower region 17. Preferably, the fuel is a reducing gas. The fuel entering the lower region 17 of the chamber 16 flows upwardly in a direction countercurrent to the direction of movement of the charge. Air is admitted into the upper region 8 of the chamber 16 and is forced to flow upwardly under the influence of the upwardly flowing fuel. Since the charge is not a solid mass but includes many discrete pieces which do not pack together too closely, a large number of interstices or spaces exist in the stack 29 so that the fuel and air are free to flow upwardly through the chamber 16.

The fuel and air mix and combust in the upper region 8 of the chamber 16 so as to preheat at least the lower end portion or leading end 30 of the stack 29, i.e., so as to preheat at least that portion of the charge which is located in the lower region 17 of the chamber 16 or, in other words, at least that portion of the charge which is located in the region where smelting occurs. It is advantageous to preheat to a temperature between 800° and 1,000°C.

Power is supplied to the electrode 5 from the power source 20 so that an electric arc 7 is struck between the upper end 19 of the electrode 5 and the lower surface or face 31 of the stack 29. Since the fuel flows through the passage 6 located between the bottom wall 4 and the electrode 5, it enters the lower region 17 of the chamber 16 in the vicinity of the arc 7. Thus, the fuel is heated by the arc 7 and, as a result of the fact that the fuel flows countercurrent to the charge, the fuel is able to convey the latent heat of the arc 7 to the stack 29 by convection.

The electrode 5 is preferably so adjusted that the arc 7 plays over the major portion of the cross-section of the face 31 and is centered with respect to this cross-section. In other words, it is preferable for the arc 7 to play over the center portion of the face 31 but not over the peripheral portion of the face 31. The arc 7 smelts the charge forming the stack 29 in such a manner that a cavity or smelting space 14 is formed in the vicinity of the arc 7. This is a result of the fact that the effect of the arc 7 extends for a certain distance in all directions around the arc 7 so that the face 31 of the stack 29 takes on an arcuate form or becomes substantially part-spherical. The cavity 14 forms of itself by virtue of the fact that the stack 29 is heated from below so that at any time only the charge in the lowermost portion of the stack 29 is being smelted. Due to heat conduction within the stack 29, and due to the heat carried by the flue gases flowing in the chamber 16, the stack 29 becomes preheated to such an extent in the vicinity of the cavity 14 that the individual pieces of material forming the stack 29 weld to one another at many points of contact and thereby form a strong support frame or structure for the charge in the upper portion of the stack 29. The entire stack 29 itself rests upon or is supported by the relatively small ring-like edge portion or rim 9 forming part of the face 31 of the stack 29. The rim 9 is continuously being consumed by the molten material which has entered and formed a pool in the collecting space 13. As a result, the charge descends continuously through the chamber 16 and fresh charge is being continuously exposed to the arc 7. Although at least portions of the marginal section or edges of the stack 29 may be in contact with the wall 1, the charge is still able to descend unhindered since the inner surface of the wall 1 is substantially smooth. Thus, by continuously smelting the stack 29 from below, the above-described mechanism is operative and the support frame or structure is continuously renewed while fresh charge is continuously exposed to the action of the arc 7. Also, since the molten material flows downwardly into the collecting space 13, the interstices between the individual pieces of material forming the stack 29 remain completely unobstructed so that the gases flowing countercurrent to the charge are able to flow freely and convey heat to the stack 29.

The arc 7 serves not only for smelting the charge but also serves to superheat the molten material. The molten material collects in the collecting space 13 and forms a pool on the inner surface of the bottom wall 4 having a liquid level 23. Since the molten material enters the pool prior to evacuation from the chamber 16, the dwell time of the molten material in the chamber 16 is increased. Furthermore, since the collecting space 13 in which the pool is formed lies in the vicinity of the arc 7, the pool of molten material is exposed to the heat generated by the arc 7. As a result, the molten material remains superheated for a longer time than if it were directly evacuated from the chamber 16. This facilitates removal of the molten material from the chamber 16. In this regard, it is advantageous for the outlet passage 21 to be located in the vicinity of the arc 7 so that the full effect of the superheating may be realized. If the outlet passage 21 were located too far from the arc 7, the molten material would cool significantly before reaching the outlet passage 21 and the superheating effect would be lost thereby increasing the difficulty of evacuating the molten material.

Thus, the invention provides a process and furnace for the continuous production of steel from scrap. The furnace is a shaft-type furnace and the smelting zone thereof is preferably of substantially uniform cross-section, although the primary criterion for the smelting zone is that the charge be able to descend continuously through the smelting zone. Furthermore, although the atmosphere in the upper region of the smelting zone, wherein combustion of fuel and air takes place, is an oxidizing atmosphere, the atmosphere in the lower region of the smelting zone, wherein smelting occurs, is a non-oxidizing atmosphere. As a result, scrap iron charged into the smelting zone may continuously be converted into steel in a single-step operation. Obviously, the invention is not limited to the conversion of scrap iron into steel. In general, the invention is applicable to the production of any metal or alloy from either ore or scrap.

As in the case when smelting with a petroleum-oxygen burner, the process of the invention, wherein an electrode is used instead of a burner, results in a smelting space being formed near the lower end of the stack. As is also the case when using a petroleum-oxygen burner, the stack is smelted in a shell-like manner from the bottom, i.e., as one layer of the stack melts, a fresh layer is exposed to be smelted. However, in the process of the invention, the charge is not oxidized as a result of the heat generated during smelting. In this regard, the product produced by the process of the invention is equivalent to that produced in a process wherein the material has undergone a purifying remelting operation in a neutral or reducing atmosphere in order to obtain the final product. Where clean scrap was used in the process of the invention, i.e., where the scrap used had been trimmed, internally circulated, etc., practically finished steel was obtained in the collecting vessel. Where worse qualities of scrap were used, the non-combustible metallic impurities (Cu, Sn, etc.) present in the scrap were smelted together with the scrap as is the case in the known electrolytic process. Also, by using the process of the invention, alloying additions may be charged directly, together with the scrap, and practically no loss of these alloying additions will occur. This, of course, applies as well to the carbon required for obtaining the desired carbon content in the steel. It is noteworthy in this regard, that the invention does not require coke in order to form a support frame or structure for the charge.

In the continuous smelting process of the invention, the heating conditions, such as the heat transfer conditions, are always the optimum conditions, the heat generated by the electric arc is used only for heating and smelting the scrap and for superheating the molten material so as to facilitate evacuation thereof, i.e., little of the heat is wasted or lost, and, simultaneously, the heat-resistant substance forming or coated on the wall of the smelting chamber is ideally protected. This is in contrast to the known, discontinuous electrolytic process. As a result, the production and thermal efficiency are high whereas the frequency with which the wall of the smelting chamber must be repaired or re-lined is low.

Even more favorable conditions may be obtained when only part of the energy required for smelting is supplied by relatively expensive electrical energy. Thus, it is advantageous to heat the charge, by means of cheaper fossil fuels, to temperatures between 800° and 1,000°C, i.e., to temperatures at which the tendency for oxidation by the oxidizing burner flame is still low.

In accordance with the invention, this favorable effect is obtained by preheating the stack of charge with natural gas, by-product coke-oven or blue-water gas, oil or corresponding gaseous or gasified combustible substances which flow countercurrent to the descending charge, and then smelting the thus-preheated charge by means of a reducing electric arc. The combustible gases, which should be free of oxygen, may be admitted into the smelting chamber from below the stack of charge so that, on the one hand, the reducing atmosphere existing in the region where smelting occurs is maintained while, on the other hand, the latent heat of the electric arc picked up by the flowing gases may be conveyed to the charge. The air required for combustion may be admitted into the smelting chamber through the walls thereof and above the region where smelting occurs so that the atmosphere created by combustion of the fuel and air does not penetrate into this region. As a result of the relatively large volume of interstices existing in a stack of charge, thorough mixing of the combustible gases with the air admitted at the marginal sections of the stack will occur by virtue of the chimney effect existing in the smelting chamber. The mixing of the combustible gases with the air may also be influenced by lengthening the flow path of the gases in longer smelting chambers.

It will be understood that each of the elements described above, or two or more together, may also find a useful application in other types of processes and constructions differing from the types described above.

While the invention has been illustrated and described as embodied in a smelting process and furnace, it is not intended to be limited to the details shown, since, various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A process for the production of steel from scrap, comprising the steps of admitting a charge into a substantially vertically arranged zone so as to form in said zone a column of said charge which descends by gravity from an upper portion to a lower portion of said zone; melting said charge in the region of said lower portion of said zone with an electric arc directed at the lower portion of said column; superheating the resulting molten material with said arc; and evacuating the superheated molten material from said zone substantially continuously during the melting step.

2. A process as defined in claim 1, wherein the melting step is performed under substantially non-oxidizing conditions.

3. A process as defined in claim 1, wherein said zone has an approximately constant cross-sectional area.

4. A process as defined in claim 3, wherein said zone is of slightly downwardly and outwardly tapering configuration.

5. A process as defined in claim 1, wherein said arc heats and melts the major part of the cross-section of said leading end.

6. A process as defined in claim 1, wherein said arc is substantially centered with respect to the cross-section of said leading end.

7. A process as defined in claim 1, wherein the superheating step comprises temporarily collecting said molten material in said lower portion of said zone.

8. A process as defined in claim 1, said zone having a bottom; and wherein said arc is effective for forming an approximately part-spherical cavity in said leading end so that only a peripheral portion of said leading end bears against said bottom to support said column in said zone.

9. A process as defined in claim 1, wherein the melting step is performed substantially continuously.

10. A process as defined in claim 1, wherein the admitting step is performed sustantially continuously.

11. A process as defined in claim 1; and further comprising the step of preheating said charge at least in the region of said lower portion of said zone.

12. A process as defined in claim 11, wherein said charge is preheated to temperatures between substantially 800° and 1,000°C.

13. A process as defined in claim 1, further comprising the steps of introducing at least one stream of fuel into said lower portion of said zone; and conveying said fuel countercurrent to the descending column.

14. A process as defined in claim 13, said stream being heated by said arc so that said stream transmits heat to said charge; and further comprising the step of introducing at least one current of air into said upper region of said zone, said stream and said current combusting in said upper region of said zone so as to preheat said charge.

15. A process as defined in claim 14, wherein the step of introducing said current of air comprises naturally aspirating air into said upper region of said zone.

16. A process as defined in claim 14, wherein the step of introducing said current of air comprises forcibly blowing air into said upper region of said zone.

17. A process as defined in claim 1, wherein said charge comprises alloying components so that said molten material is in the form of steel having a desired analysis.

18. A process as defined in claim 17, wherein said alloying components are substantially uniformly distributed throughout said charge.

* * * * *